May 24, 1927.
W. FERRIS ET AL
1,629,818
BUSHING
Original Filed Dec. 2, 1921
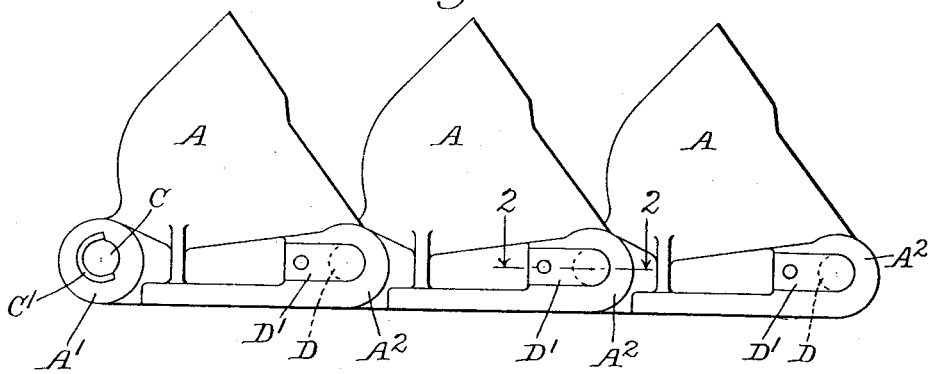
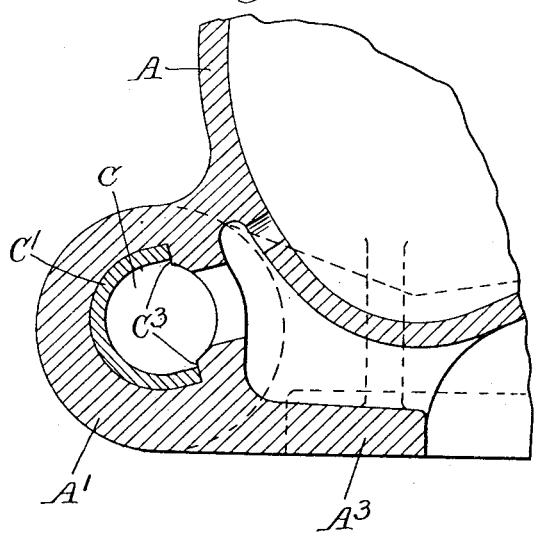
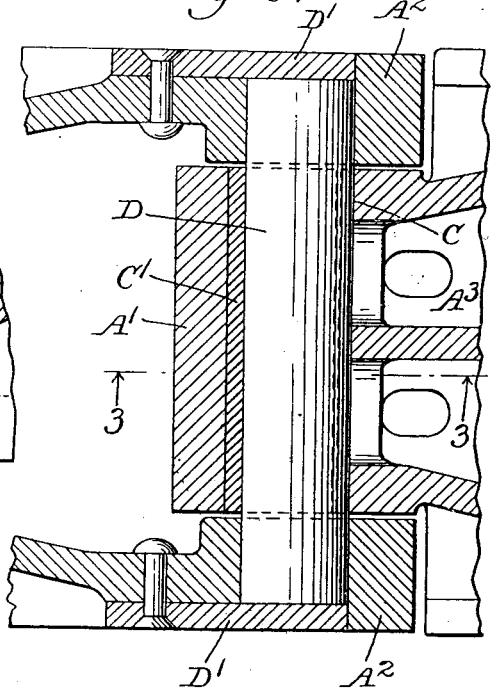
Inventors
Walter Ferris.
Matthew F. Keese.
by Parker & Carter
Attorneys.

Patented May 24, 1927. 1,629,818

UNITED STATES PATENT OFFICE.

WALTER FERRIS, OF MILWAUKEE, AND MATTHEW F. KEESE, OF SOUTH MILWAUKEE, WISCONSIN, ASSIGNORS TO BUCYRUS COMPANY, OF SOUTH MILWAUKEE, WISCONSIN, A CORPORATION OF WISCONSIN.

BUSHING.

Original application filed December 2, 1921, Serial No. 519,359. Divided and this application filed January 26, 1923. Serial No. 614,951.

Our invention relates to placer dredging chains and particularly to a bushing for use with such chains, although it is of course susceptible for use with other mechanisms. A particular object is to provide a bucket bushing which shall be particularly stable and safe from shifting in its seat and which shall be adapted to prevent any escape of or wedging of the bushing between the bucket pin and the inner corners of the bushing engaging shoulders.

We illustrate our invention more or less diagrammatically in the following drawings wherein:

Figure 1 is a side view of a bucket chain;
Figure 2 is a section on line 2—2 of Figure 1;
Figure 3 is a section on lines 3—3 of Figure 2.

Like parts are indicated by like symbols throughout the specification and drawings.

A is a cast placer mining bucket, the details of which are more fully described in the co-pending application No. 519,359 filed December 2, 1921, of which the present application is a division. The bucket is cast integral with a link element which has at one end the single eye $A^1$ located at the center of the chain axis, and at the opposite end the opposed pair of eyes $A^2$, $A^2$, spaced at either side from the chain axis or longitudinal center line of the link, the space between being equal to the width of the eye $A^1$. Extending forwardly from the eye $A^1$ is the tread portion $A^3$, the details of which form no part of the present invention. The rear eye $A^1$ is apertured as at C to form an aperture bounded by two concentric arcs of different radii, adapted to receive about substantially more than one-half of its circumference the inserted bushing $C^1$, the ends of which contact the opposed surfaces $C^3$ $C^3$ in the body of the eye which form abutting surfaces of greater width than if placed diametrically opposed, since the outer sides of the bushing ends are parallel, forming lines tangential to the outer circumference of the bushing. D is the bucket pin kept in place by the removable plates $D^1$.

It will be understood that while an operative device is herein shown and described many changes might be made in the number, size and relation of parts without departing from the spirit of our invention.

The use and operation of our invention are as follows:

In the earlier buckets the bushing $C^1$ formed one-half of an annulus, and in practice the bearing surfaces at its ends frequently became sufficiently worn and battered to permit the bushing to revolve in its seat and to wedge in between the pin and the inner wall of the bearing aperture. The present form makes this impossible, since the bushing is carried beyond the diametrically opposed points of the earlier bushing and its ends are opposed by more deeply recessed abutting surfaces. Experience has shown that the present form is substantially free from the objections above outlined and the bushing, when once seated, rests firmly in place and does not tend to escape.

We claim:

1. In an articulated excavator chain: a link having a bushed eye; a bushing comprising a portion whose outer and inner surfaces are concentric semicylindrical surfaces; the portion so formed being extended into tangential portions formed integral therewith; and shoulders, formed in the aperture of the eye, and adapted to receive the abutting ends of the bushing.

2. A bushed link for articulated chains, having an articulating pin; the link portion being formed with an eye, of which the cross section has an arc of less than 180 degrees, terminating in a pair of shoulders, the radius of said arc being but slightly larger than the radius of the articulating pin; said cross section having another arc of 180 degrees with a radius materially larger than that of the articulating pin, thus forming a chamber for bushing; two parallel tangents, produced from the ends of the larger arc, to intersect the shoulders of the smaller arc; and a bushing substantially filling the space defined by the larger arc, the two tangents, the shoulders and the articulating pin.

3. A bushed link for articulated chains; the link being formed with an eye having two substantially concentric portions of different diameters, separated by recesses in the wall of the eye; the cylindrical portion of lesser diameter extending about an arc of less than 180 degrees; a pin penetrating said eye; and a bushing between said pin and the cylindrical portion of larger diameter, the edges of the bushing abutting against the walls of said recesses.

4. In combination, a link having an eye bounded in part by two substantially concentric cylindrical surfaces of different diameters, the cylindrical surface of lesser diameter describing an arc substantially shorter than the arc described by the cylindrical portion of larger diameter, the cylindrical surfaces being connected by abutment surfaces; and a bushing, the cylindrical portion of whose inner surface describes an arc of substantially the same diameter as the arc described by the cylindrical eye surface of smaller diameter the edges of said bushing abutting against said abutment surfaces.

Signed at Milwaukee, Wisconsin this 9th day of January, 1923.

WALTER FERRIS.

Signed at South Milwaukee, Wisconsin this 19th day of January, 1923.

MATTHEW F. KEESE.